W. G. NEWTON.
MIXING VALVE.
APPLICATION FILED AUG. 24, 1906.

927,000.

Patented July 6, 1909.
2 SHEETS—SHEET 1.

William G. Newton, Inventor

W. G. NEWTON.
MIXING VALVE.
APPLICATION FILED AUG. 24, 1908.
927,000.
Patented July 6, 1909.
2 SHEETS—SHEET 2.
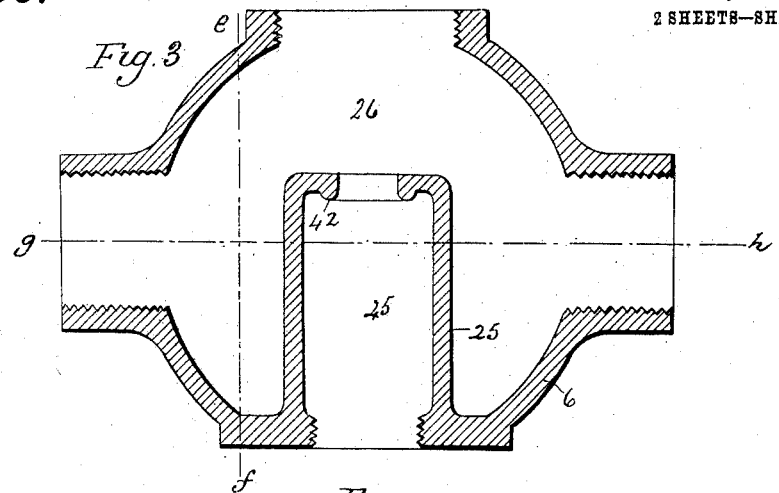
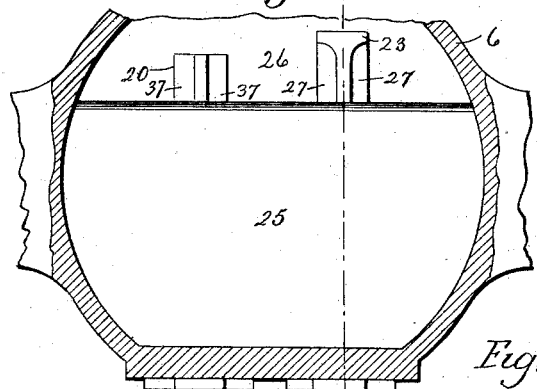
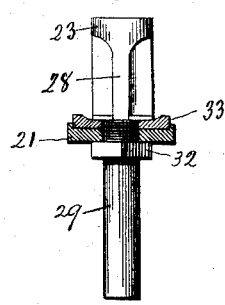
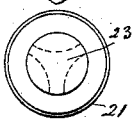
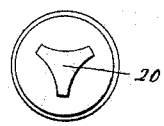
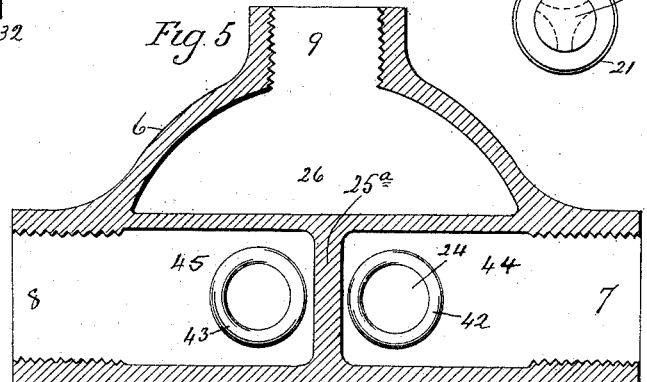
Witnesses
J. H. Shumway
C. L. Weed
William G. Newton
Inventor
By attys Seymour & Earle

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

MIXING-VALVE.

No. 927,000.     Specification of Letters Patent.     Patented July 6, 1909.

Application filed August 24, 1906. Serial No. 331,828.

*To all whom it may concern:*

Be it known that I, WILLIAM G. NEWTON, a citizen of the United States, residing at New Haven, in the county of New Haven and State of Connecticut, have invented a new and useful Improvement in Mixing-Valves; and I do hereby declare the following, when taken in connection with the accompanying drawings and the characters of reference marked thereon, to be a full, clear, and exact description of the same, and which said drawings constitute part of this specification, and represent, in—

Figure 1:
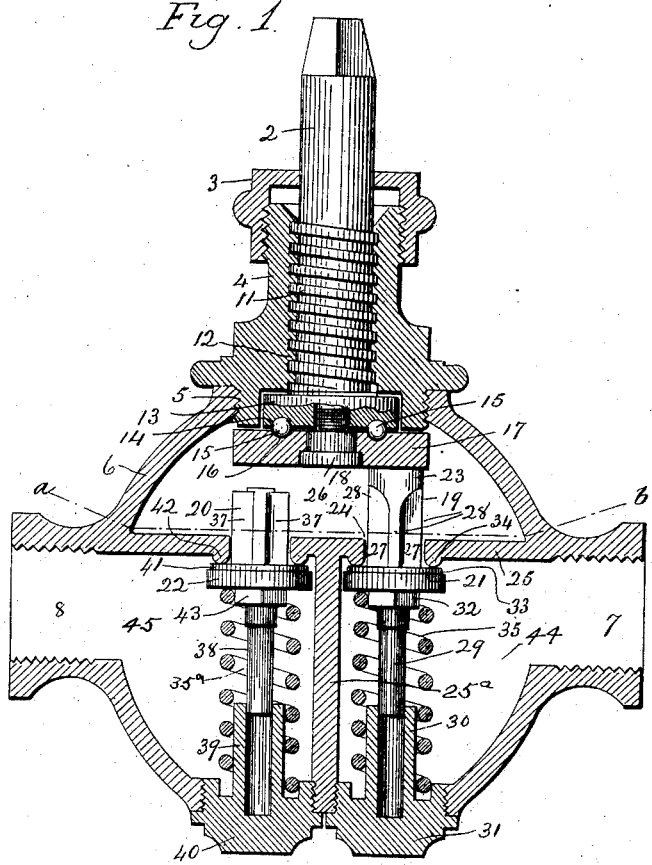
Figure 2:
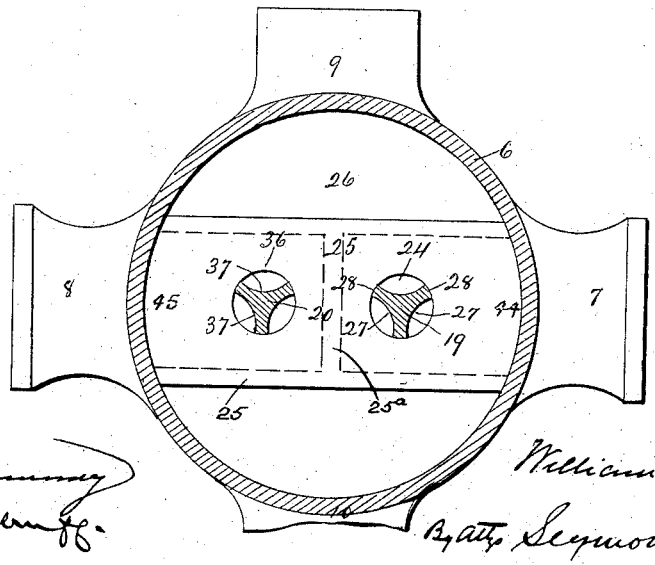

Figure 1 a view in vertical section of a mixing valve constructed in accordance with my invention, and shown with both valves closed. Fig. 2 a broken view in horizontal section on the line *a—b* of Fig. 1. Fig. 3 a detached broken view in vertical section of the valve-body stripped of all appurtenances and taken on the line *c—d* of Fig. 4. Fig. 4 a detached broken view in vertical section of the valve-body on the line *e—f* of Fig. 3 and stripped but for the valves themselves. Fig. 5 a detached broken view of the valve-body in horizontal section on the line *g—h* of Fig. 3 and looking upward. Fig. 6 a detached plan view of the hot water valve. Fig. 7 a detached plan view of the cold water valve. Fig. 8 a view partly in elevation, and partly in vertical section of the cold water valve.

My invention relates to an improvement in that class of valves called temperature or mixing valves, and used in conjunction with bath tubs and the like, for mixing cold and hot water, the object being to produce an extremely simple and reliable valve constructed with particular reference to preventing the water of one system from circulating with that of the other, owing to variations in pressures.

With these ends in view, my invention consists in a mixing valve having certain details of construction as will be hereinafter described and pointed out in the claims.

In carrying out my invention as herein shown, I employ a spindle 2 to which any suitable handle may be attached, none being shown. This spindle has bearing in its upper end in a stuffing-box 3 screwed upon a bonnet 4 which in turn is screwed into a large opening 5 in the top of the spherical valve-body 6 which is provided with a cold water inlet 7, a hot water inlet 8, and two mixed water outlets 9 and 10 arranged quartering with respect to each other in the same horizontal plane. The said spindle 2 has a thread 11 taking into a thread 12 in the bonnet, the pitch of the threads being varied as it is desired to have the operation of the valve quick or slow. At its lower end the spindle has a fixed bearing-disk 13 formed in its lower face with a circular runway 14 receiving a group of anti-friction balls 15 also running in a runway 16 in the upper face of a rotary bearing disk 17 held in place by a screw 18 entering the center of the fixed disk 13. When turned by its handle so as to move downward, the spindle 2 moves the disk 17 so as to successively engage and operate the extensions 19 and 20 respectively of the cold water valve 21 and the hot water valve 22 which are located in lines parallel with the axis of the spindle and operate in those lines.

The extension 19 of the cold water valve 21 is triangular or spider-like in cross-sectional form, as shown by Fig. 7, and surmounted by a cap 23 with which the lower face of the disk 17 directly engages. The edges of its ribs or webs engage with the walls of the cold water port 24 which is formed in the upper wall of a housing 25 rising in the valve-body 6 and virtually surrounded by the mixing chamber 26, the engagement of the edges of the ribs with the walls of the port guiding the valve. As will be noticed by reference to Fig. 1, the water ways 27 between the ribs taper out at their upper ends as at 28 and are thus virtually contracted so that when the extension 19 is depressed, the flow of cold water through the port 24 will be gradually cut off and so prevent the user of the fixture from being scalded as he would be if the cold water were suddenly cut off, leaving the hot water to flow untempered. The said extension 19 is located at the upper end of a valve-stem 29 the lower end of which enters a bore in a long sleeve 30 formed upon the inner end of a plug 31 screwed into the bottom of the valve-body 6. At the base of the said extension the stem is formed with threads for a nut 32 which holds the valve proper 21 in place against a packing 33 which in turn impinges against the washer-like lower end of the extension. The valve proper 21 consists of a washer having its upper face recessed for the reception of the packing 33 which is pressed against an annular valve seat 34 formed upon the inner face of the top of the housing 25 aforesaid. A spring 35 encircling the valve-stem 29 and the sleeve 30 normally holds the packing 33 against the seat 34. The extension 20 of the hot water valve 22 is also triangular or spider-like in form and guided by the engagement of the edges of its ribs or webs with the wall of the hot water port 36 in the top of the housing 25, but the extension 20 has no cap corresponding to the cap 23 before described, and its water ways 37 are not contracted. It is formed at the upper end of a valve stem 38 having bearing in the sleeve 39 of a plug 40 entered into the bottom of the valve-body 6 and corresponding to the plug 31 before mentioned. The valve proper 22 is cupped to receive a packing 41 bearing against an annular valve-seat 42 upon the inner face of the top of the housing, and is supported by a washer 43 screwed upon threads on the stem 38. A spring 35$^a$ encircling the stem 37 and the sleeve 39 normally holds the packing 41 against the seat 42. These two valves and their appurtenances are alike in all respects with the exception that the cold water valve extension 19 is provided with a cap 23 and has its water ways 28 contracted or tapered out so as to gradually cut off the cold water. The said housing 25 rises centrally within the mixing-chamber 26 to a point somewhat above the center thereof as shown in Figs. 1, 3 and 4, and is arranged lengthwise between the cold-water inlet 7 and the hot-water inlet 8 as shown in Figs. 2 and 5. The mixing-chamber 26 therefore extends over and down on each side of the said housing 25. The housing is internally divided by a centrally arranged transverse web or partition 25$^a$ into a cold-water valve-chamber 44 containing the cold-water valve 21 and its appurtenances, and a hot-water valve-chamber 45 containing the hot-water valve 22 and its appurtenances. The cold-water inlet 7 leads into the outer end of the cold-water chamber 44, while the hot-water inlet leads into the outer end of the hot-water valve-chamber 45.

With reference to the operation of my improved mixing valve, let it be supposed that the valve is closed, as shown in Fig. 1. Now if the handle is turned through one complete turn, the spindle will operate through the rotary disk 17 and the extension 19 to depress the cold water valve 21 sufficiently to admit cold water freely into the mixing chamber 26 without at all disturbing the hot water valve 22. Another complete turn of the handle causes the spindle to be further depressed and with it the bearing disk 17 which depresses the hot water extension 20 so as to open the hot water valve 22. The cold water extension 19 will be correspondingly lowered at the same time, but without changing the amount of cold water admitted into the mixing chamber 26. Cold water and hot water in equal volumes will now flow into the said mixing chamber to be drawn off through the outlets 7 and 8. If the mixture is not warm enough, the handle will be turned, not necessarily a full turn, but sufficiently to bring the contracted upper ends 28 of the water ways 27 of the cold water extension 19 into play for reducing the amount of cold water passed by the cold water valve 21 without, however, affecting the amount of hot water passed by the hot water valve 22. The valves are automatically closed by the water pressures when the handle is reversed. Normally the disk 17 will be cleared sufficiently from the extension 19 of the cold-water valve so as to make sure that the valve-operating disk does not interfere with the action of the water-pressure and the spring of the valve from holding the valve firmly upon its seat. This normal clearance of the disk 17 from the cold-water extension 19 is secured by simply closing the valve the spindle of which is not stopped in its rotation in closing until after the disk 17 has been cleared from the cold-water extension. Therefore when the valve is closed the disk 17 is free to rotate independently of the disk 13 which is rigid with the valve-spindle 2 which must be measurably turned in order to move the disk 17 longitudinally enough to bring its lower face into contact with the cold-water extension 19. This initial rotation of the spindle may or may not be accompanied by a corresponding rotation of the disk 17. Thus if the spindle is started suddenly, the inertia of the disk 17 will be greater than the friction tending to rotate the disk 17 with the spindle which if very suddenly started would not turn the disk 17 at all. On the other hand if the spindle is suddenly started and stopped, the disk 17 might be actuated in rapid rotation independently of the spindle. The object of thus making the disk 17 rotatable independently of the spindle is in order that the disk may constantly present new surfaces to coact with the valve-extensions 19 and 20 for securing uniform wear. Moreover the concentration of the wear at fixed points would tend constantly to increase the maximum distance between the disk and the extensions and call upon a constantly increasing rotation of the spindle for the operation of the valve. In other words, wear between the valve extensions and the spindle increases the lost motion between these parts which must be taken up every time the valve is operated. From the moment the spindle 2 has been turned sufficiently to engage the disk 17 with the cold water extension 19 the disk 17 will be held against rotation by the friction developed between it and the cold water extension by the force of the water pressures and the spring of the cold water valve. The friction thus developed is always greater than the friction of the connection between the spindle and the disk, this friction being reduced to a negligible amount by the anti-friction balls 15. From the moment, then, of the engagement of the disk 17 with the cold-water extension 19 the disk is held against rotation as it is longitudinally moved inward by the turning of the spindle 2. Therefore it is held against rotation by the extension 19 when it comes into engagement with the extension 20. After that moment the water pressures on both valves and the springs of both valves act upon the disk to hold it against rotation. As the valve is closed by the reverse movement of the spindle, the extension 20 of the hot-water valve breaks connection with the disk first; but the disk is still held against rotation by the extension 19 of the cold water valve until just before the spindle reaches the limit of its rotation in closing, when the lower face of the disk is cleared from the extension 19 so as to leave the water pressure and spring to fully close the cold water valve. After this has transpired the disk 17 is left free to rotate, which it will do in the ordinary use of the valve sufficiently to constantly present new surfaces for engagement with the extensions.

It will be observed that both of the valves are closed with the water pressures which are added to their springs in holding them on their seats. Therefore the greater the water pressures the more firmly the valves will be held on their seats. It follows that there is no such thing, in my improved valve, as the circulation of the water of one system with the water of the other system which is apt to occur with the use of valves closed against the water pressures.

It will also be noted that my improved construction provides for removing and replacing the valves 21 and 22 without in any way disturbing the spindle 2 by which they are operated, and that the action of the spindle upon the valves is always in a line parallel with their longitudinal axis and unaccompanied by any side thrusts.

I claim:—

1. In a mixing valve, the combination with two spring-actuated valves held against their seats by the water pressures and their springs and having operating-extensions of unequal lengths by which they are opened, of a rotatable and longitudinally movable valve-spindle, a bearing-disk located at the inner end of the said spindle and rotating and moving longitudinally therewith, a valve-operating disk interposed between the said bearing-disk and the said valve-operating extensions with which latter it is adapted to be frictionally engaged by the longitudinal movement of the spindle upon which it is loosely mounted, and anti-friction balls between the two disks, whereby the valve-operating disk is free to be rotated independently of the bearing-disk at any time before the engagement of its lower face with the longer of the two valve-operating extensions.

2. In a mixing valve, the combination with a valve-body having a cold-water inlet, a hot-water inlet, two mixed-water outlets, and a housing rising within the said body and containing a cold-water valve-chamber and a hot-water valve-chamber separated from each other and respectively communicating with the said cold and hot-water inlets, the space between the top and sides of the housing and the walls of the valve-body forming a mixing-chamber into which the said valve-chambers open through ports in the top of the said housing; of a spring-actuated cold-water valve and a spring-actuated hot-water valve respectively located in the said chambers in position to be automatically closed by the water pressures and their springs and provided with operating extensions entering the said mixing-chamber through the said ports, the extension of the cold-water valve being longer than that of the hot-water valve; a rotatable and longitudinally movable valve-spindle, a bearing-disk located at the inner end of the said spindle and rotating and moving longitudinally therewith, a valve-operating disk interposed between the said bearing-disk and the said valve-operating extensions with which latter it is adapted to be frictionally engaged by the longitudinal movement of the spindle upon which it is loosely mounted, and anti-friction balls between the two disks, whereby the valve-operating disk is free to be rotated independently of the bearing-disk at any time before the engagement of its lower face with the longer of the two valve-operating extensions.

3. In a mixing valve, the combination with a valve-body having a housing rising centrally within it and containing a cold-water valve-chamber and a hot-water valve-chamber separated from each other, the space between the sides and top of the said housing and the adjacent walls of the valve-body forming a mixing-chamber, and the top of the said housing being formed with ports opening into the said mixing-chamber; of spring-actuated cold and hot-water valves respectively located within the said chambers in position to be automatically closed by the water pressures and their springs and provided with operating extensions entering the mixing-chamber through the said ports, the extension of the cold-water valve being longer than that of the hot-water valve and formed with tapered ways to prevent the cold water from being suddenly cut off, a rotatable and longitudinally movable valve-spindle, a bearing-disk located at the inner end of the said spindle and rotating and moving longitudinally therewith, a valve-operating disk interposed between the said bearing-disk and the said valve-operating extensions with which latter it is adapted to be frictionally engaged by the longitudinal movement of the spindle upon which it is loosely mounted, and anti-friction balls between the two disks, whereby the valve-operating disk is free to be rotated independently of the bearing-disk at any time before the engagement of its lower face with the longer of the two valve-operating extensions.

In testimony whereof, I have signed this specification in the presence of two subscribing witnesses.

WILLIAM G. NEWTON.

Witnesses:
 B. L. TUTTLE,
 R. G. ELDRIDGE.